United States Patent [19]

Gradler et al.

[11] 4,431,317

[45] Feb. 14, 1984

[54] DEVICE FOR ADJUSTING THE CLEARANCE BETWEEN THE END SURFACE OF A ROTATIONALLY MOUNTED COMPONENT PART WITH RESPECT TO A MOUNTING STRUCTURE

[75] Inventors: Wilhelm Gradler, Ergolding; Karl E. Kloke; Karlheinz Linner, both of Landshut, all of Fed. Rep. of Germany

[73] Assignee: International Standard Electric Corp., New York, N.Y.

[21] Appl. No.: 384,227

[22] Filed: Jun. 2, 1982

Related U.S. Application Data

[63] Continuation of Ser. No. 164,890, Jun. 30, 1980, abandoned.

[30] Foreign Application Priority Data

Jul. 3, 1979 [DE] Fed. Rep. of Germany ....... 2926707

[51] Int. Cl.³ ............................................. F16C 25/04
[52] U.S. Cl. ...................................... 384/192; 310/90
[58] Field of Search ............... 384/129, 192, 202, 203, 384/204, 206, 193, 199, 200, 208, 275, 276, 280, 297; 310/90

[56] References Cited

U.S. PATENT DOCUMENTS

| 2,603,674 | 7/1952 | Koch | 310/258 |
| 3,359,628 | 12/1967 | Rutledge et al. | 384/416 X |
| 3,391,290 | 7/1968 | Hahndorf et al. | 384/221 X |
| 3,720,852 | 3/1973 | Vieweg et al. | 384/215 X |
| 3,770,331 | 11/1973 | Sellers et al. | 384/229 |
| 3,846,652 | 11/1974 | Lykes | 384/402 X |
| 4,008,928 | 2/1977 | Abel | 384/207 |
| 4,079,277 | 3/1978 | Osanai | 310/90 |
| 4,128,778 | 12/1978 | Merkle et al. | 310/90 X |

FOREIGN PATENT DOCUMENTS

| 415101 | 9/1946 | Italy . |
| 55-86923 | 7/1980 | Japan . |

Primary Examiner—Stuart S. Levy
Assistant Examiner—David Werner
Attorney, Agent, or Firm—T. E. Kristofferson; W. T. O'Neil

[57] ABSTRACT

An end-play adjusting device including a molded thermoplastic sleeve-like member about the shaft of an electric motor armature, or the like. The sleeve is applied in a maximum axial length and subsequently compressed to reduce its axial length to whatever provides the desired end-play to the bearings or other support structure.

2 Claims, 4 Drawing Figures

DEVICE FOR ADJUSTING THE CLEARANCE BETWEEN THE END SURFACE OF A ROTATIONALLY MOUNTED COMPONENT PART WITH RESPECT TO A MOUNTING STRUCTURE

This is a continuation of application Ser. No. 164,890, filed June 30, 1980, now abandoned.

BACKGROUND OF THE INVENTION

1. Field of the Invention

The invention relates generally to devices for adjusting clearance between surfaces of a relatively mounted component part holder and its support structure, and more particularly for adjustment of axial clearance (end-play) between the rotor and the stator support structure in an electric motor.

2. Description of the Prior Art

In the typical prior art, in particular as it relates to small electric motors, an armature has an axial shaft supported by bearings mounted in a stator housing structure. Manufacturing tolerance problems encountered in large scale production of such items precludes consistent rotor end-play from sample to sample. Accordingly, some device or structure is required to permit adjustment of end-play as a step in the manufacture of such electric motors.

One prior art device is described in German Pat. No. 15 38 921. In that conventional device the rotationally mounted component part, i.e. the cylinder and surface of a squirrel-cage rotor, is provided with a hollow (indented) space. While adjusting the distance, a self-curing plastic compound is inserted into this hollow space, in which a spacer is pressed more or less deep, and is fixed there in position after the curing of the compound.

Any prior art process relying on insertion of a self-curing material initially in liquid or semi-liquid form presents disadvantages. One of these disadvantages resides in the fact that a self-curing plastic compound, such as a casting resin, owing to its sticky consistency, presents handling difficulties in quantity production of the components. It unavoidably soils the work as well as the work environment and can only be well handled in fully automatic production involving high investment in tooling and machinery. Another disadvantage resides in that the compound itself requires a curing time, so that components on which the adjustment has been carried out cannot be put into operation immediately after the adjustment for the purpose of carrying out intermediate checks or for further processing purposes.

SUMMARY

It may be said to have been the general object of the invention, therefore, to provide a device for adjusting the clearances which, owing to its neutral consistency, is easy to handle in manufacture. Moreover, it is desirable that the adjusted component be effectively finished, i.e. capable of being put into operation immediately after the adjustment. The manner in which the invention fulfills the objectives will be evident as this description proceeds.

According to the invention, this object is achieved in that the spacing member consists of an attachment, such as a sleeve, which completely fills the interface (end-play space) prior to the adjustment, and is arranged axially non-displaceable on the rotationally mounted component part, specifically on the rotor shaft, and is plastically deformable by the action of heat.

Further advantageous details of the invention will be explained hereinafter.

DETAILED DESCRIPTION

Figure 1:
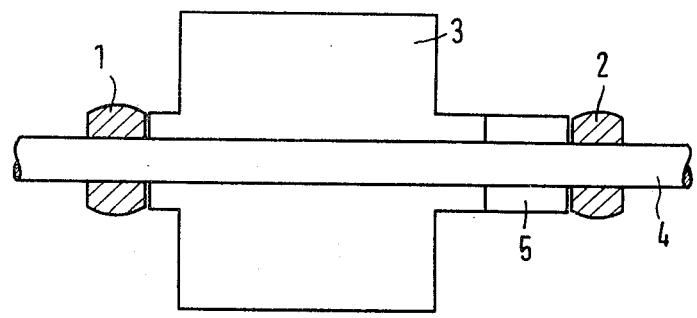
FIG. 1 shows a rotor as supported in bearings of an electric motor, prior to the end-play adjustment.
Figure 2:
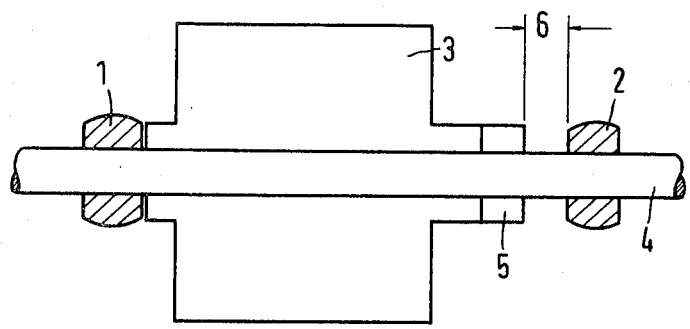
FIG. 2 shows the rotor according to FIG. 1, after the end-play adjustment.

The drawings illustrate the invention in which the adjustment of the end-play of a rotor of an electric motor is accomplished. FIG. 1 schematically shows the rotor 3 as rotationally supported in the bearings 1 and 2, and firmly connected to the shaft 4. Owing to the unavoidable manufacturing tolerances occurring in the mass-production of components, the rotor, if no additional steps were taken, would normally be seated in an unpredictably variable tight or loose manner between the bearings 1 and 2, respectively. It is necessary, therefore, to provide a defined axial clearance (end-play) during manufacture. In the present case, this is accomplished in that at the one end of the rotor 3, between the latter and the bearing 2, there is inserted a sleeve 5 of material which is plastically deformable by the action of heat. The sleeve 5 has at least such a length that it, in the case of a non-adjusted axial play, fills the existing end-play gap between the rotor 3 and the sliding bearings 1 and 2. Adjustment of the defined axial play is carried out in that the sleeve 5 is plastically deformed, for example with the aid of a hot force plug, thus being reduced by a certain length. From this there will result the defined axial (end) play 6 shown exaggerated in FIG. 2.

The end play adjustment can be carried out in a simple manner, and the adjusted component is ready for use immediately thereafter.

In order to keep the volume which is to be plastically deformed, as small as possible during the end play adjustment, it has proved suitable to design the sleeve 5 within its area to be plastically deformed, to have the shape of a castellated (castle) nut.

The plastic member 5 may be selected from a large variety of thermoplastic materials, however a glass-fiber reinforced polyamid sleeve moulded directly onto shaft 4 has been found to be advantageous.

Figure 3:
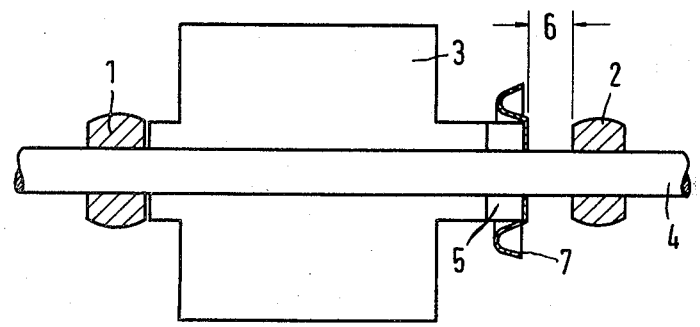
FIG. 3 shows a modification of the device according to FIG. 1 and 2, including a shaped disc.
Figure 4:
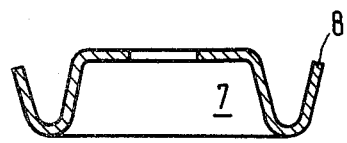
FIG. 4 is a detail of the disc according to FIG. 3.

FIGS. 3 and 4 show an advantageous further embodiment of the invention in which on the end face of the sleeve 5 as facing the bearing 2, there is arranged a pan-like disc 7 provided with a peripheral edge 8, the disc being of a heat-resisting material, such as steel. Disc 7 might also be described as being in the shape of a cup washer. Heat application can, in this case be made about the periphery of disc 7.

The disc 7 offers advantages in two respects. On one hand, during the plastic deformation of the sleeve 5 it provides a uniform heat transfer to the sleeve, and tends to "take up" the plastically deformed material in its pan-shaped interior space. On the other hand, on the finished motor, centrifugal force at its peripheral edge 8 tends to turn spun off lubricant emerging from the bearing 2, back thereto.

It should be realized that the invention is not limited to an electric motor application, but can be employed for clearance adjustment in any apparatus where optimum end-play is desired.

What is claimed is:

1. A device for adjusting the axial clearance of a rotor member affixed to a shaft, between first and second bearings providing support with rotational freedom of said rotor member and shaft, comprising:

a structure supporting said bearings with axial spacing between said first and second bearings exceeding the axial dimension between first and second axial ends of said rotor member;

a sleeve-like spacer of a material subject to heat deformation, substantially filling the axial space between said first bearing and a corresponding first end of said rotor about said shaft, to produce optimum end-play between said rotor first end and said first bearing when said rotor second end substantially abuts said second bearing; and including a disc of heat resistant material in the shape of a cup washer located between said spacer and said first bearing, said disc having a central cup portion the inside of which faces toward and receives an end of said spacer and the outer periphery of which comprises a flange flared outward in the general direction of said first bearing.

2. Apparatus for adjusting the axial clearance of a rotor member affixed to a shaft, between said rotor member and at least one of the first and second bearings, said rotor having a shaft supported with rotational freedom by said bearings, and said bearings being supported by a structure such that the axial spacing between said first and second bearings exceeding the axial dimension between first and second axial ends of said rotor member, comprising:

at least one sleeve-like spacer of thermoplastic material subject to heat-induced deformation, said spacer substantially filling the axial space between at least said first bearing and the corresponding end of said rotor prior to heat deformation of said spacer, said spacer being capable of providing optimum rotor end-play after heat deformation of said spacer, and a disc of heat resistant material in the general shape of a cup washer located between said spacer and said first bearing, said disc having a central cup portion the inside of which faces toward and receives an end of said spacer, the outer periphery of said disc including a flange flared outward in the general direction of said first bearing.

* * * * *